(12) United States Patent
Ma et al.

(10) Patent No.: US 7,317,680 B2
(45) Date of Patent: Jan. 8, 2008

(54) CHANNEL MAPPING FOR OFDM

(75) Inventors: Jianglei Ma, Kanata (CA); Wen Tong, Ottawa (CA); Ming Jia, Ottawa (CA); Peiying Zhu, Kanata (CA); Dong-Sheng Yu, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 1016 days.

(21) Appl. No.: 10/261,739

(22) Filed: Oct. 1, 2002

(65) Prior Publication Data
US 2004/0062193 A1    Apr. 1, 2004

(51) Int. Cl.
H04J 11/00    (2006.01)
(52) U.S. Cl. .................. 370/203; 370/206; 370/210
(58) Field of Classification Search ............... 370/203, 370/206, 210, 208
See application file for complete search history.

(56) References Cited

U.S. PATENT DOCUMENTS

| | | | | |
|---|---|---|---|---|
| 5,818,813 A * | 10/1998 | Saito et al. | ........... | 370/208 |
| 5,912,917 A | 6/1999 | Engelbrecht et al. | ........ | 375/37 |
| 6,192,026 B1 * | 2/2001 | Pollack et al. | ........... | 370/203 |
| 6,563,881 B1 * | 5/2003 | Sakoda et al. | ........... | 375/260 |
| 2002/0150038 A1 * | 10/2002 | Sumasu et al. | ............ | 370/208 |

FOREIGN PATENT DOCUMENTS

WO    WO 99/65155    12/1999

OTHER PUBLICATIONS

Naguib, Ayman et al., "Applications of Space-Time Block Codes and Interference Suppression for High Capacity and High Data Rate Wireless Systems," Conference Record of the Thirty-Second Asilomar Conference on Signals, Systems & Computers, pp. 1803-1810, Pacific Grove, CA, USA Nov. 1998, ISBN 0-78036-5148-7.
Takamura, K. et al., "Field Trail Results of a Band Hopping OFDM System," IEEE VTS 50th Vehicular Technology Conference, pp. 310-314, Gateway to the 21st Centuray Communications Village, Amsterdam, 1999, ISBN 0-7803-5436-2.
Wang, Z. and Stirling-Gallacher, R.A., "Improving Performance of Multi-User OFDM Systems Using Bit-Wise Interleaver," Electronic Letters, vol. 37, No. 19, pp. 1173-1174, Sep. 2001.
Wong, Moon Fone, and Boukli-Hacene, Mokhtar, "Performance Analysis of OFDM/FHMA Hybrid System Operation in ISM Band," Milcom '96 Conference Proceedings, pp. 369-373, IEEE McLean, Virginia, Oct. 1996, ISBN 0-7803-3682-8.
PCT International Search Report for PCT/IB03/04272, mailed Dec. 29, 2003.

* cited by examiner

Primary Examiner—Chi Pham
Assistant Examiner—Phuc H Tran
(74) Attorney, Agent, or Firm—Withrow & Terranova, PLLC

(57) ABSTRACT

The present invention provides a technique for supporting variable bitrate services in an OFDM environment while minimizing the impact of the variations of fading channels and interference. In general, a basic access channel (BACH) is defined by a set number of sub-carriers over multiple OFDM symbols. While the number of sub-carriers remains fixed for the BACH, the sub-carriers for any given BACH will hop from one symbol to another. Thus, the BACH is defined by a hopping pattern for a select number of sub-carriers over a sequence of symbols.

47 Claims, 11 Drawing Sheets

CHANNEL MAPPING FOR OFDM

FIELD OF THE INVENTION

The present invention relates to wireless communications, and in particular to channel mapping in an orthogonal frequency division multiplexing system.

BACKGROUND OF THE INVENTION

Since orthogonal frequency division multiplexing (OFDM) is a multi-carrier transmission technique, the available spectrum is divided into many sub-carriers, each being modulated by data at a relatively low data rate. OFDM supports multiple access by allocating different sub-carriers to different users. The sub-carriers for OFDM are orthogonal and closely spaced to provide an efficient spectrum. Each narrow band sub-carrier is modulated using various modulation formats, such as quadrature phase-shift keying (QPSK) and quadrature amplitude modulation (QAM). OFDM modulation is provided using an Inverse Fast Fourier Transform (IFFT). Initially, data for transmission is mapped into quadrature-based symbols that are encoded onto the individual sub-carriers. An IFFT is performed on the set of modulated sub-carriers to produce an OFDM symbol in the time domain. Typically, a cyclic prefix is created and appended to the beginning of the OFDM symbol before it is amplified and transmitted. During reception, the OFDM symbols are processed using a fast Fourier transform (FFT) to recover the modulated sub-carriers, from which the transmitted symbols can be recovered and decoded to arrive at the transmitted data.

As noted, to facilitate multiple user access, data for transmission is allocated to groups of adjacent sub-carriers, wherein these groups remain consistent from one OFDM symbol to the next. With reference to FIG. 1, each circle represents a sub-carrier for a sequence of OFDM symbols. Each row represents the sub-carriers associated with an OFDM symbol, and each OFDM symbol is transmitted in sequence over time. In this example, users 1 and 2 require a voice service, wherein users 3 and 4 require data and video services, respectively. The voice services require lower data rate than the data services, while the video service requires the most resources. As such, the groups of sub-carriers dedicated to voice, such as that for users 1 and 2, are less than that for users 3 and 4. User 4 is using as much of the spectrum as the first three users combined. Notably, along the time-frequency plane for the OFDM spectrum, the mapping of user data to various sub-carriers is repetitive and consistent. Due to the significant variations in the communication channel, especially for the frequency selective fading channel, and interference over the time-frequency plane, such multiple access mapping results in a different carrier-to-interference ratio for each user. The different carrier-to-interference ratios will lead to unequal degradation of performance for each user.

In an effort to minimize the impact of the variations in the channel, frequency-hopping schemes have been employed to systematically remap the groups of sub-carriers associated with each user to different points in the time-frequency plane, as illustrated in FIG. 2. Thus, users are assigned one or more transmission blocks consisting of a set number of sub-carriers within a set number of adjacent OFDM symbols. Thus, a user does not necessarily transmit on the same sub-carrier group for every OFDM symbol, but will jump to a different sub-carrier after a period of time based on the defined hopping pattern. The sub-carrier hopping scheme illustrated in FIG. 2 improves the performance over the fixed time-frequency allocation illustrated in FIG. 1; however, the performance could be further improved if the diversity across the whole band were fully exploited.

Further to the need to efficiently accommodate services requiring various bitrates and the ability to switch from one service to another for a given user, there is a need to readily control sub-carrier allocation to support a multi-user variable bitrate service. Thus, there is a need for an efficient, sub-carrier mapping technique to support variable bitrate services and minimize the impact of channel variations and interference over the time-frequency plane.

SUMMARY OF THE INVENTION

The present invention provides a technique for supporting variable bitrate services in an OFDM environment while minimizing the impact of the variations of fading channels and interference. In general, a basic access channel (BACH) is defined by a set number of sub-carriers over multiple OFDM symbols. While the number of sub-carriers remains fixed for the BACH, the sub-carriers for any given BACH will hop from one symbol to another. Thus, the BACH is defined by a hopping pattern for a select number of sub-carriers over a sequence of symbols.

In the preferred embodiment, the BACH has the following attributes. The BACH is formed by a group of sub-carriers distributed across several OFDM symbols as described above. In each OFDM symbol, $2^n$ sub-carriers are assigned to a given BACH, where n is an integer. The sub-carriers in the BACH are equally spaced in the frequency domain and distributed across the entire frequency band. When each BACH has $2^n$ sub-carriers that are equally spaced, a subset fast Fourier transform (FFT) can be applied to extract only the sub-carriers in the BACH during reception. The subset FFT reduces the computational complexity associated with a full range FFT capable of operating over the entire OFDM symbol to recover each of the sub-carriers associated with the OFDM symbol, instead of just those associated with the BACH. Preferably, a pseudo-random pattern is employed for sub-carrier mapping for the BACHs from one OFDM symbol to the next to effectively distribute the BACH across the whole band of sub-carriers as efficiently as possible. If space-time coding (STC) is implemented for any of the given users, the sub-carriers associated with a BACH over consecutive OFDM symbols within a given STC block will remain the same to keep the STC-related information together.

The number of services and number of users supported by the system can be dynamically adjusted based on the number of BACHs assigned to a user and scheduling. When the minimum access channel is a BACH, the channel for a select user is often composed of several BACHs. The number of BACHs occupied by the user is determined by throughput requirements. As noted, a voice channel may only need one BACH, while high-speed data transmissions may need several BACHs. By controlling the number of time slots allocated to a user during scheduling, throughput rates may be further controlled. Further, in a cellular environment including multiple base stations, each base station will use a pseudo-random or different pre-determined allocation sequence for BACH mapping of multiple users to reduce collisions between BACHs of different cells.

In addition to the frequency hopping for the multiple access scenario described above, spatial diversity can be exploited when base stations have more than one antenna. This can be realized by V-BLAST layer hopping when V-BLAST is applied in the transmission, or by antenna switching when only one antenna transmission is employed. To enhance a fully loaded system, a controlled reuse of the BACHs may be implemented wherein BACHs for additional users are overlaid on top of the time-frequency plane, and in particular on top of existing BACHs. The overlay of the BACH will cause collision of the corresponding BACHs, and therefore intra-cell interference; however, by exploiting adaptive coding and modulation with powerful forward error correction, the collision loss can be minimized and the additional throughput gain can be achieved.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique for supporting variable bitrate services in an OFDM environment while minimizing the impact of channel variations and interference. In general, a basic access channel (BACH) is defined by a set number of sub-carriers over multiple OFDM symbols. While the number of sub-carriers remains fixed for the BACH, the sub-carriers for any given BACH will hop from one symbol to another. Thus, the BACH is defined by a hopping pattern for a select number of sub-carriers over a sequence of symbols.

Figure 1:
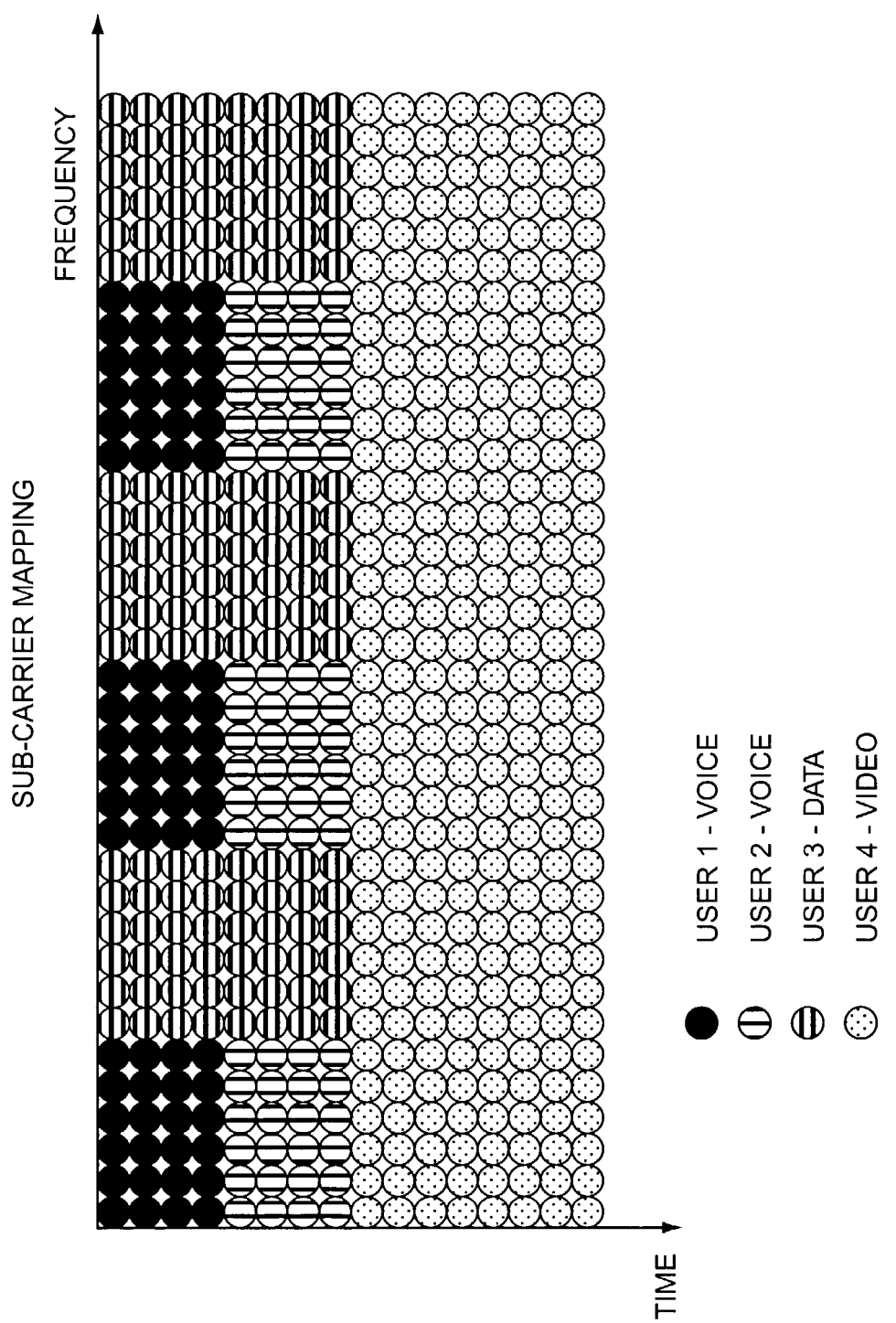
FIG. 1 is an OFDM time-frequency plane according to one prior art embodiment.
Figure 2:
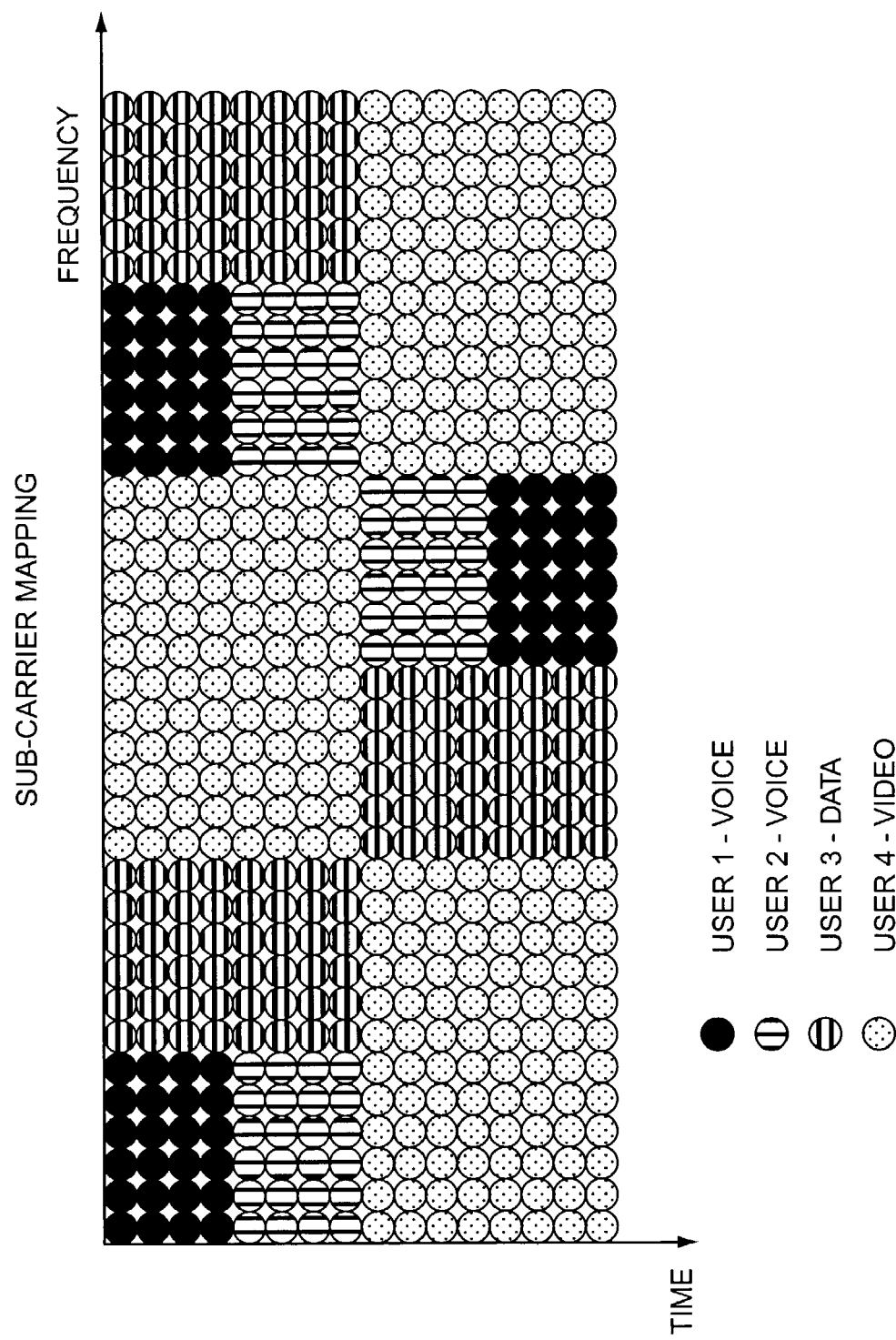
FIG. 2 is an OFDM time-frequency plane according to a second prior art embodiment.
Figure 3:
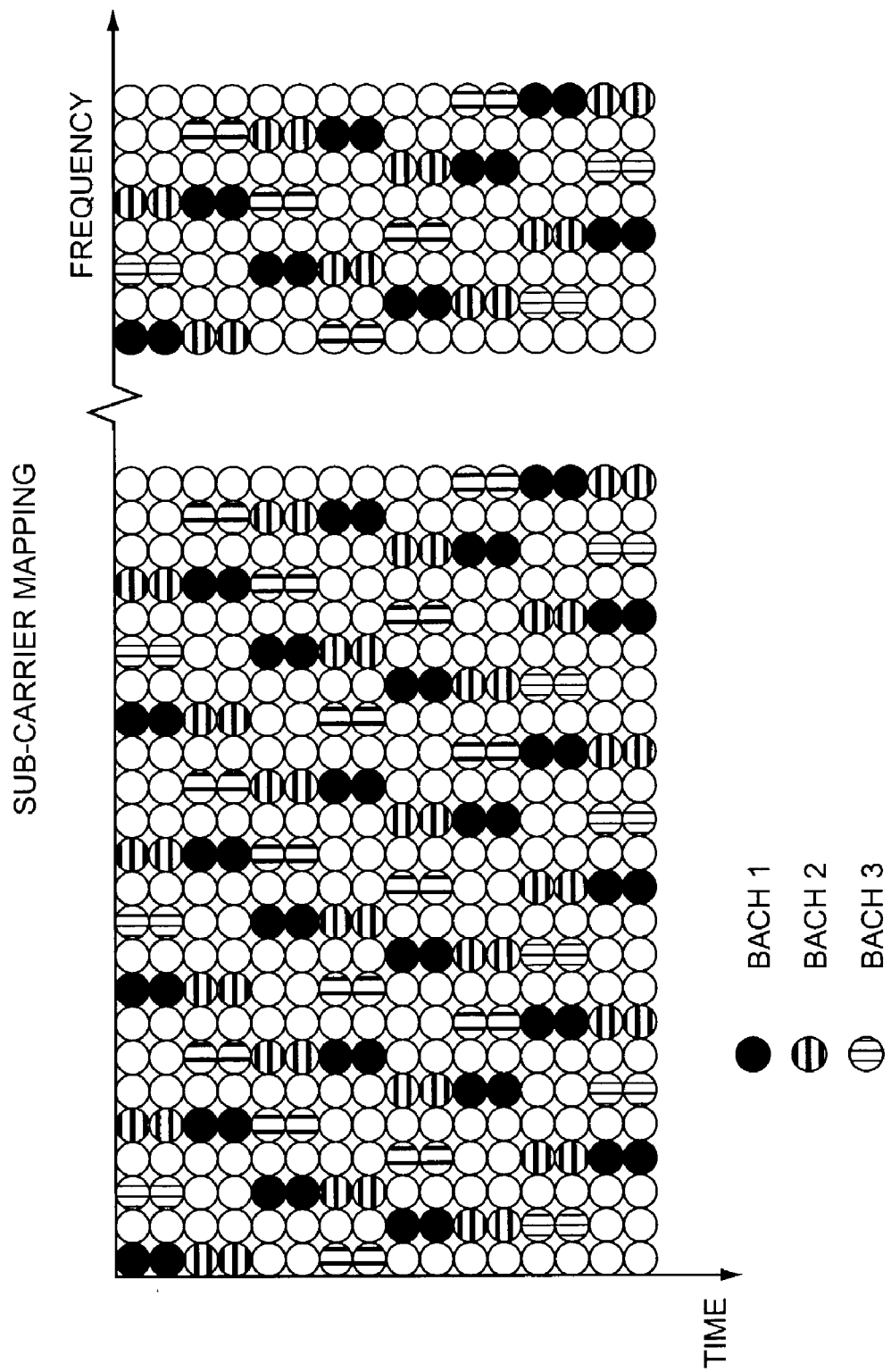
FIG. 3 is a time-frequency plan highlighting an exemplary embodiment of the present invention.

With reference to FIG. 3, an exemplary time-frequency plane in an OFDM spectrum is illustrated, wherein three BACHs (BACH 1, BACH 2, and BACH 3) are defined over numerous symbols. Each row represents the available sub-carriers associated with a given OFDM symbol. Thus, from one symbol to the next, each BACH is associated with a group of sub-carriers, which may or may not hop from one symbol to the next depending on the mapping scheme. In operation, data for a given user is associated with one or more BACHs, depending on the necessary throughput. Preferably, a single BACH is sufficient to support voice communication, wherein multiple BACHs may be allocated to a given user to support higher throughput data and video services. The allocation of BACHs to users may dynamically vary depending on the required throughput. In addition to the number of BACHs associated with a user, throughput rates may also depend on how data for the user is scheduled and the frequency at which data is scheduled. Thus, data may be scheduled for a first group of users associated with a BACH during a first transmission time slot, and a second group of users associated with the same BACH during a subsequent time slot.

In the preferred embodiment, the BACH has the following attributes. The BACH is formed by a group of sub-carriers distributed across several OFDM symbols as described above. In each OFDM symbol, $2^n$ sub-carriers are assigned to a given BACH, where n is an integer. The sub-carriers in the BACH are equally spaced in the frequency domain and distributed across the whole band. When each BACH has $2^n$ sub-carriers that are equally spaced, a subset fast Fourier transform (FFT) can be applied to extract only the sub-carriers in the BACH during reception. The subset FFT reduces the computational complexity associated with a full range FFT capable of operating over the entire OFDM symbol to recover each of the sub-carriers associated with the OFDM symbol, instead of just those associated with the BACH. Preferably, a pseudo-random pattern is employed for sub-carrier mapping for the BACHs from one OFDM symbol to the next to effectively distribute the BACH across the whole band of sub-carriers as efficiently as possible. If space-time coding (STC) is implemented for any of the given users, the sub-carriers associated with a BACH over consecutive OFDM symbols within a given STC block will remain the same to keep the STC-related information together.

The number of services and number of users supported by the system can be dynamically adjusted based on the number of BACHs assigned to a user and scheduling. When the minimum access channel is a BACH, the channel for a select user is often composed of several BACHs. The number of BACHs occupied by the user is determined by throughput requirements. As noted, a voice channel may only need one BACH, while high-speed data transmissions may need several BACHs.

Figure 4:
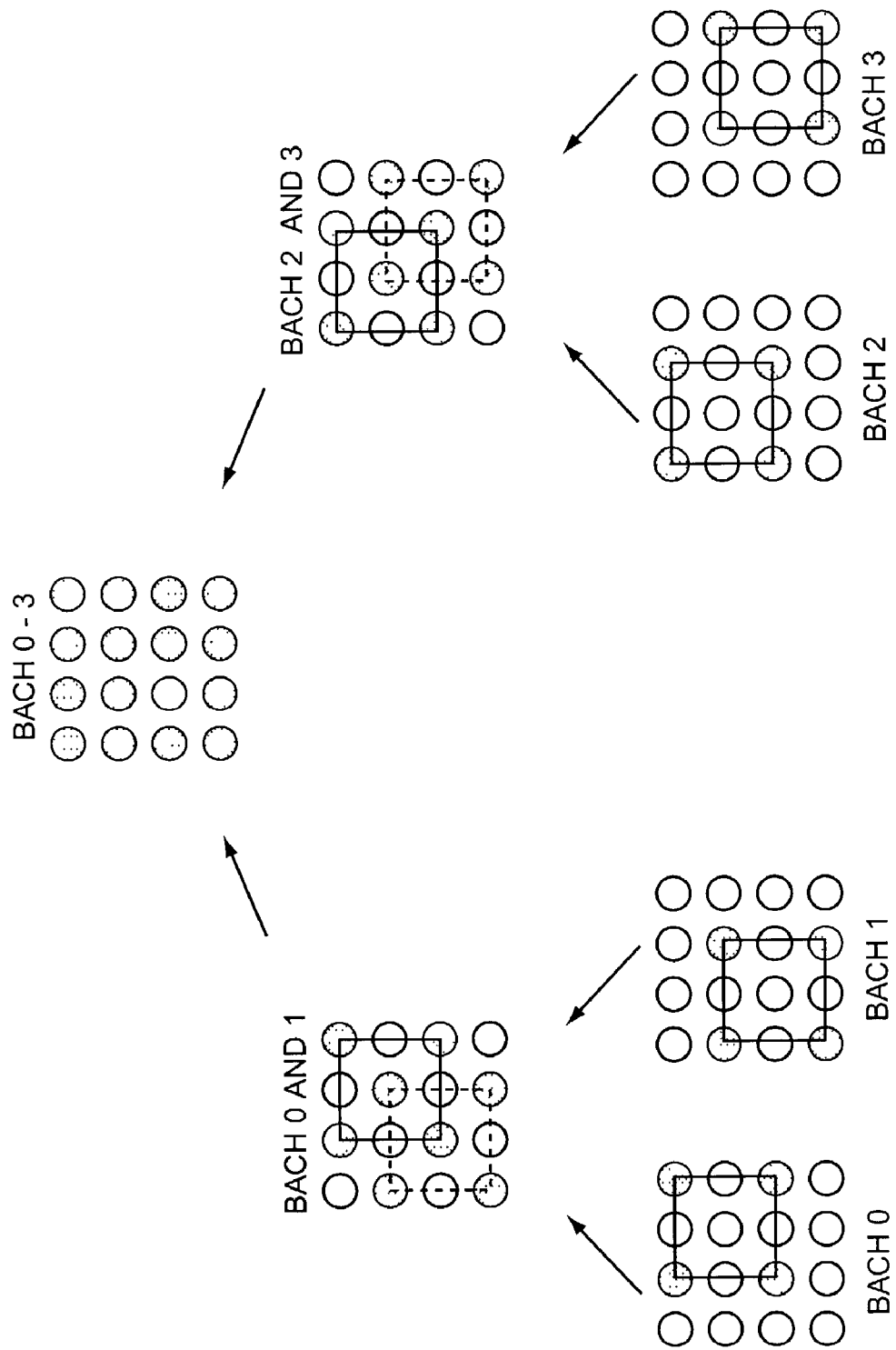
FIG. 4 illustrates a preferred process for allocating multiple basic access channels (BACHs) to a common user according to one embodiment of the present invention.

Preferably, when multiple BACHs are assigned to a single user, the BACHs are assigned to that user such that the sub-carriers associated with the given BACHs at any given time are separated from each other as much as possible on the time-frequency plane. In short, the BACHs assigned to a common user are selected to maximize the separation among sub-carriers. FIG. 4 represents a simplified embodiment, wherein four BACHs (BACH 0 through BACH 3), which have four sub-carriers each, are illustrated over a small portion of a time-frequency plane. As illustrated, each sub-carrier within any given BACH is separated by a sub-carrier in both time and frequency. If a user assigned to one of the BACHs must have two BACHs to facilitate the required services, the BACHs will be grouped as either BACH 0 and BACH 1 or as BACH 2 and BACH 3. As illustrated, the combinations of either BACH 0 and BACH 1 or BACH 2 and BACH 3 provide sub-carrier allocation that is optimally distributed over the time-frequency plane. As such, the sub-carrier separation is maximized for any given user. The process of maximizing separation among sub-carriers for a group of BACHs assigned to a single user is referred to as the maximum distance partition rule. If the user requires all four BACHs (0 through 3), all of the sub-carriers in the illustrated embodiment are allocated to the user via the four BACHs (0 through 3). By controlling the number of time slots allocated to a user during scheduling, throughput rates may be further controlled. Further, in a cellular environment including multiple base stations, each base station will use a pseudo-random or different predetermined allocation sequence for BACH mapping of multiple users to reduce collisions between BACHs of different cells.

Figure 5:
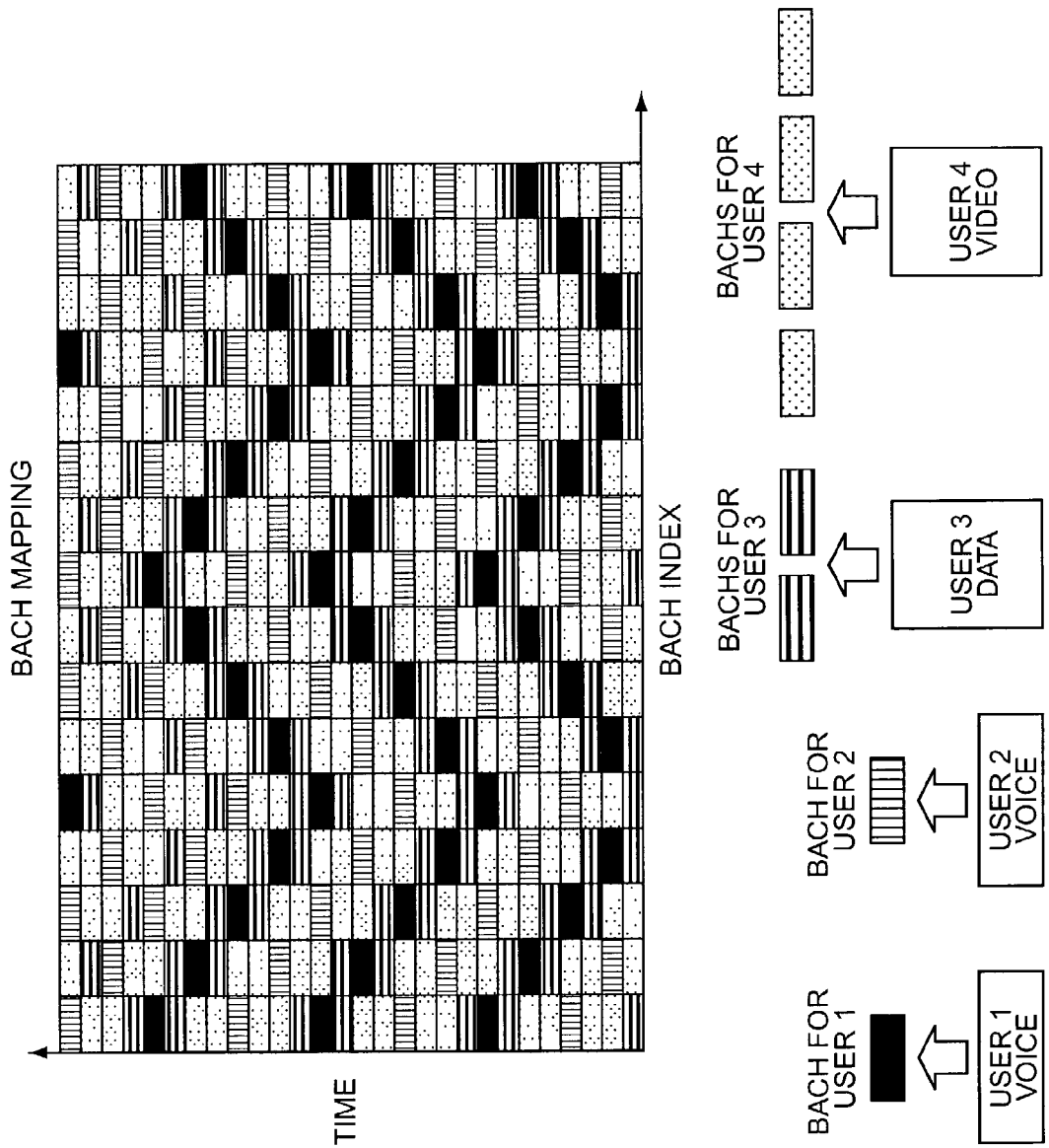
FIG. 5 is a basic access channel (BACH) indexing plan according to one embodiment of the present invention.

Once BACHs are defined throughout the OFDM spectrum, user data can be allocated to the various BACHs as illustrated in FIG. 5. As illustrated, data for the various users are efficiently and evenly distributed throughout the time-frequency plane. Further, the voice applications of users 1 and 2 use only half the resources of the data service associated with user 3. The video application associated with user 4 receives twice the resources as the data application of user 3. The mapping index of FIG. 5 illustrates how data is indexed to the BACHs assigned to each user over time, as well as how data is scheduled for each user. Notably, the number of BACHs and frequency of scheduling affects throughput in a defined manner. Further, within each BACH, sub-carrier mapping is controlled according to a pattern known by both the transmitter and receiver.

Figure 6:
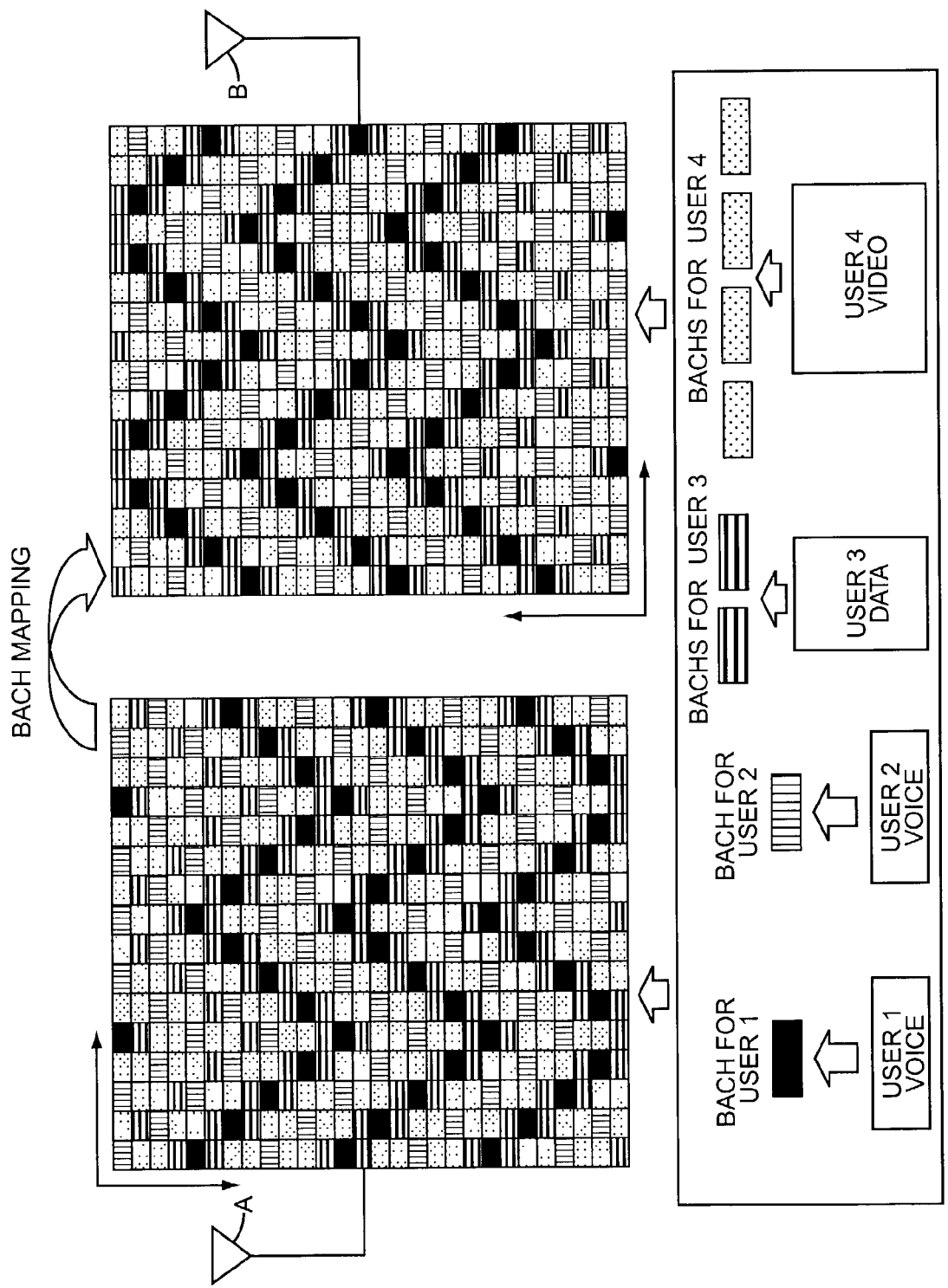
FIG. 6 illustrates a spatial diversity technique according to one embodiment of the present invention.

In addition to the frequency hopping for the multiple access scenario described above, spatial diversity can be exploited when base stations have more than one antenna. For example, two types of spatial hopping are described below, wherein one is for a multiple input multiple output (MIMO) system and the other is for a multiple input single output (MISO) system. To increase the input of a MIMO system, an STC technique, V-BLAST, is often used. In V-BLAST systems, different data is transmitted through different antennas. As such, there is no redundancy between the transmit antennas. One implementation in a multi-user application is to encode the bitstream from different users into a common symbol, and then transmit it from its respective antenna. This technique is referred to as layer hopping, wherein the data stream for a given user is alternatively mapped to a different transmit antenna according to a certain pattern. For an OFDM-based MIMO system, the BACH assignment for each user's service can hop between the different BLAST layers. An effective way to implement such a system is to use a simple time reversal pattern of a time-frequency plane, and apply that pattern to a second layer for transmission through a second antenna. Accordingly, the BACHs for any given OFDM symbols transmitted from the respective antennas are unique in their sub-carriers, as well as data. An example time reversal scheme is illustrated in FIG. 6, wherein the BACH indexing for the time-frequency plan of FIG. 5 is transmitted through antenna A, and the time reversal of that plan is transmitted through antenna B.

Alternatively, antenna switching may be used to effectively provide spatial diversity when MIMO or MISO systems are working under 1×1 or 1×M configurations. Antenna switching-based BACH assignment for single input single output (SISO) or single input multiple output (SIMO) transmissions refers to a technique wherein during for a first time slot the BACHs assigned to a user are transmitting through one antenna, and for the next slot the transmissions are switched to another antenna.

Figure 7:
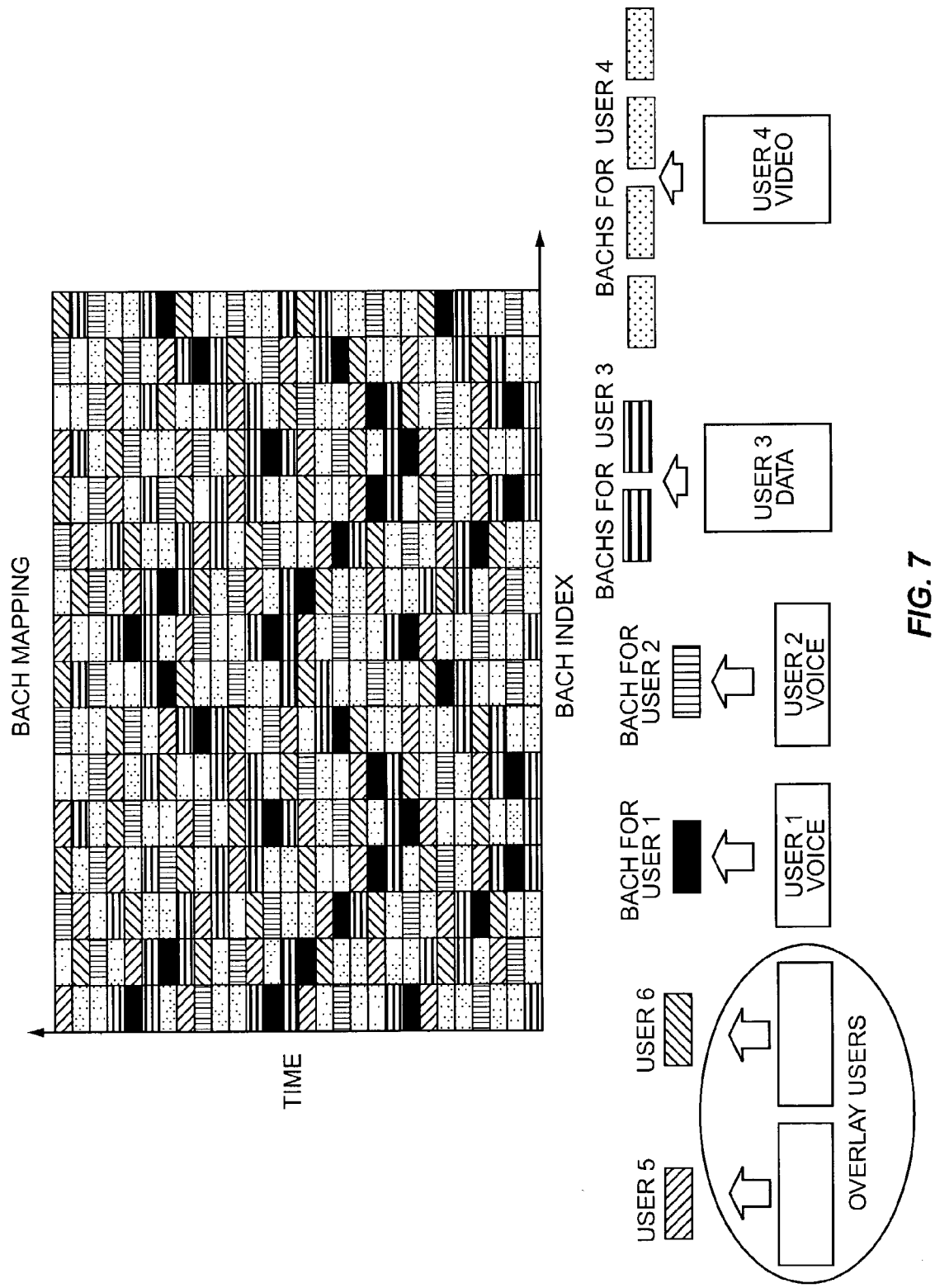
FIG. 7 illustrates an overlay technique according to one embodiment of the present invention.

The above multiplexing techniques based on BACHs provide significant performance gain when the system is not fully loaded. Gains can also be achieved when the system is fully loaded, such as when the BACH units are fully utilized throughout the time-frequency plane. To enhance a fully loaded system, a controlled reuse of the BACHs may be implemented wherein BACHs for additional users are overlaid on top of the time-frequency plane, and in particular on top of existing BACHs. The overlay of the BACH will cause collision of the corresponding BACHs, and therefore intra-cell interference; however, by exploiting adaptive coding and modulation with powerful forward error correction, the collision loss can be minimized and the additional throughput gain can be achieved. For BACH overlay, a key aspect is to reuse and control allocation in the space-time-frequency dimension of the BACH overlay. The hopping pattern of the overlaid BACH may be different from that of the existing BACHs, such that the impact of BACH collision can be reduced. An example BACH overlay approach is illustrated in FIG. 7, wherein two additional users are systematically and evenly overlaid in a distributed manner throughout the time-frequency plane as represented by the BACH index. The original, or underlying, multiplexing scheme is that illustrated in FIG. 5, with the two additional users, users 5 and 6, overlaid thereon. Of further note, different BACH indexing for the various cells, sectors, or base stations that are adjacent to one another minimizes the interference from adjacent cells and sectors. An exemplary architecture for implementing the above concepts is illustrated below. Those skilled in the art will recognize the various modifications and changes from that described below that are still within the scope of the teachings herein and the claims that follow.

Figure 8:
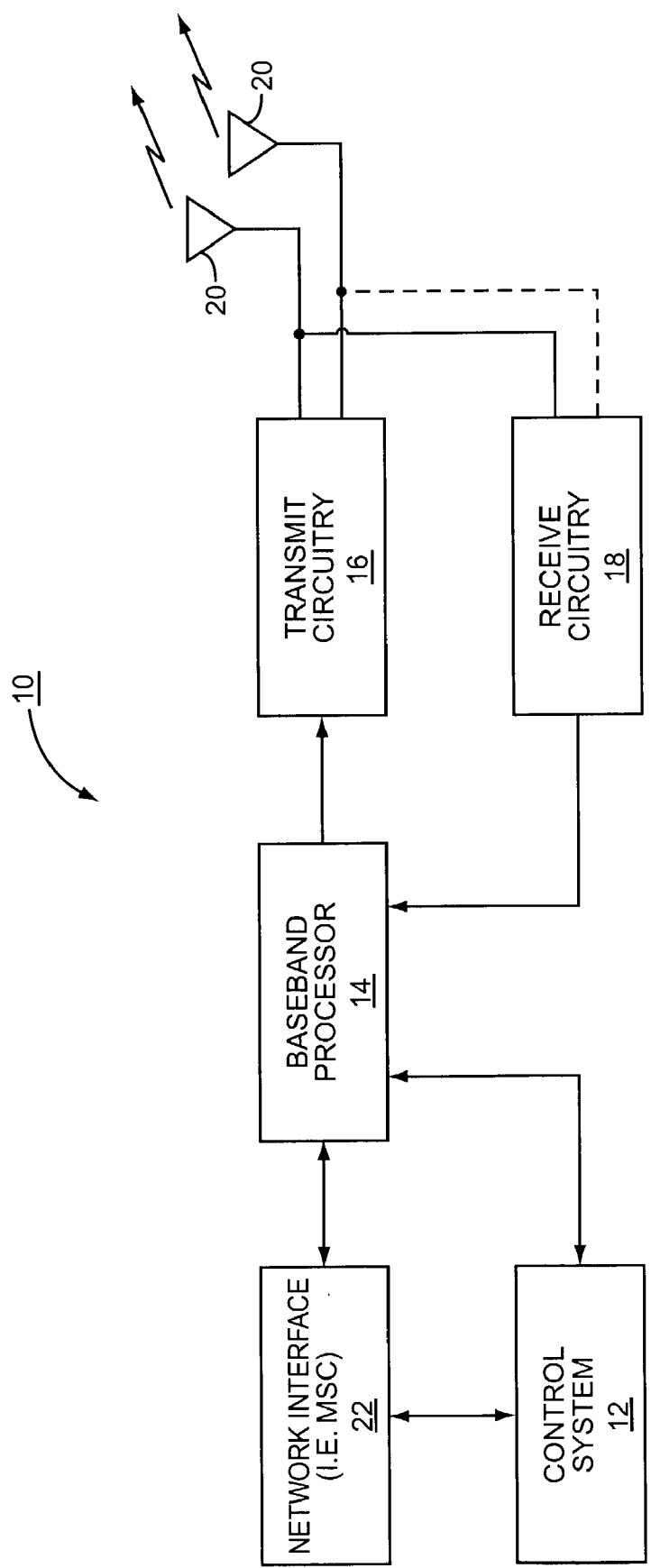
FIG. 8 is a block representation of a base station according to one embodiment of the present invention.

With reference to FIG. 8, a base station 10 configured according to one embodiment of the present invention is illustrated. The base station 10 generally includes a control system 12, a baseband processor 14, transmit circuitry 16, receive circuitry 18, multiple antennas 20, and a network interface 22. The receive circuitry 18 receives radio frequency signals bearing information from one or more remote transmitters provided by user elements 24, such as mobile telephones, personal digital assistants, wireless modems, and the like (illustrated in FIG. 9).

The baseband processor 14 processes the digitized received signal signals from the receive circuitry 18 to extract the information or data bits conveyed in the received signal. This processing typically comprises OFDM demodulation, decoding, and error correction operations. As such, the baseband processor 14 is generally implemented in one or more digital signal processors (DSPs). The received information is then sent across a wireless network via the network interface 22 or transmitted to another user element 24 serviced by the base station 10. The network interface 22 will typically interact with a circuit-switched network forming a part of a wireless network, which may be coupled to the public switched telephone network (PSTN). For example, the network interface 22 may communicate with a mobile switching center (MSC) servicing multiple base stations 10.

On the transmit side, the baseband processor 14 receives digitized data, which may represent voice, data, or control information, from the network interface 22 under the control of control system 12, which encodes the data for transmission. The encoded data is output to the transmission circuitry 16 for OFDM modulation. A power amplifier (not shown) will amplify the modulated OFDM signals to a level appropriate for transmission, and deliver the modulated carrier signal to the antennas 20 through a matching network (not shown). Modulation and processing details are described in greater detail below.

Figure 9:
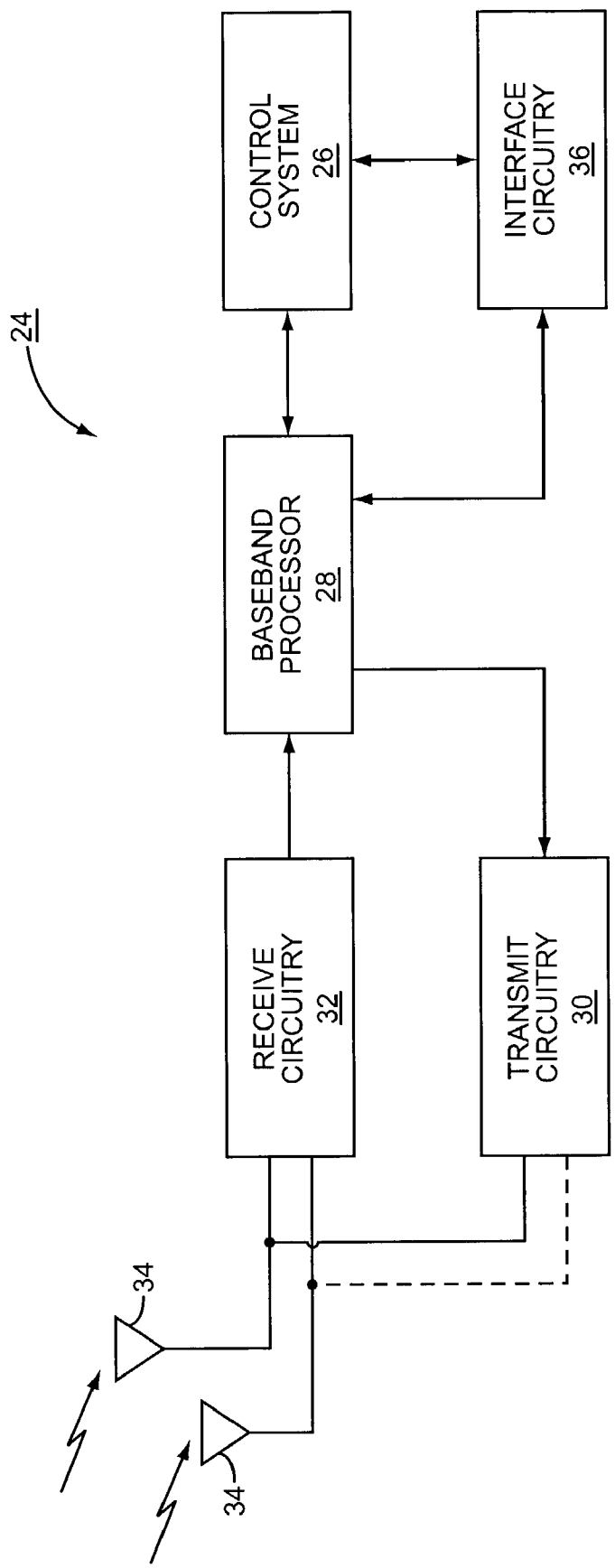
FIG. 9 is a block representation of a user element according to one embodiment of the present invention.

With reference to FIG. 9, a user element 24 configured according to one embodiment of the present invention is illustrated. Similarly to the base station 10, the user element 24 will include a control system 26, a baseband processor 28, transmit circuitry 30, receive circuitry 32, multiple antennas 34, and user interface circuitry 36. The receive circuitry 32 receives OFDM frequency signals bearing information from one or more remote transmitters provided by base stations 10. Preferably, a low noise amplifier and a filter (not shown) cooperate to amplify and remove broadband interference from the signal for processing. The baseband processor 28 processes the digitized received signal to extract the information or data bits conveyed in the received signal. This processing typically comprises demodulation using a Fast Fourier Transform, decoding, and error correction operations as will be discussed on greater detail below. The baseband processor 28 is generally implemented in one or more digital signal processors (DSPs).

For transmission, the baseband processor 28 receives digitized data, which may represent voice, data, or control information, from the control system 26, which it encodes for transmission. The encoded data is output to the transmit circuitry 30, where it is used by a modulator to modulate a carrier signal that is at a desired transmit frequency or frequencies. A power amplifier (not shown) will amplify the modulated carrier signal to a level appropriate for transmission, and deliver the modulated carrier signal to the antennas 34 through a matching network (not shown).

As noted, the present operation uses OFDM in a communication system, which may incorporate spatial diversity. OFDM modulation requires the performance of an Inverse Fast Fourier Transform (IFFT) on the symbols to be transmitted. For demodulation, the performance of a Fast Fourier Transform (FFT) on the received signal is required to recover the transmitted symbols. In practice, the Inverse Discrete Fourier Transform (IDFT) and Discrete Fourier Transform (DFT) are implemented using digital signal processing for modulation and demodulation, respectively.

In the preferred embodiment, OFDM is used at least for the downlink transmission from the base stations 10 to the user elements 24. Further, the base stations 10 are synchronized to a common clock. Each base station 10 is equipped with n transmit antennas 20, and each user element 24 is equipped with m receive antennas 34. Notably, the respective antennas can be used for reception and transmission using appropriate duplexers or switches and are so labeled only for clarity.

Figure 10:
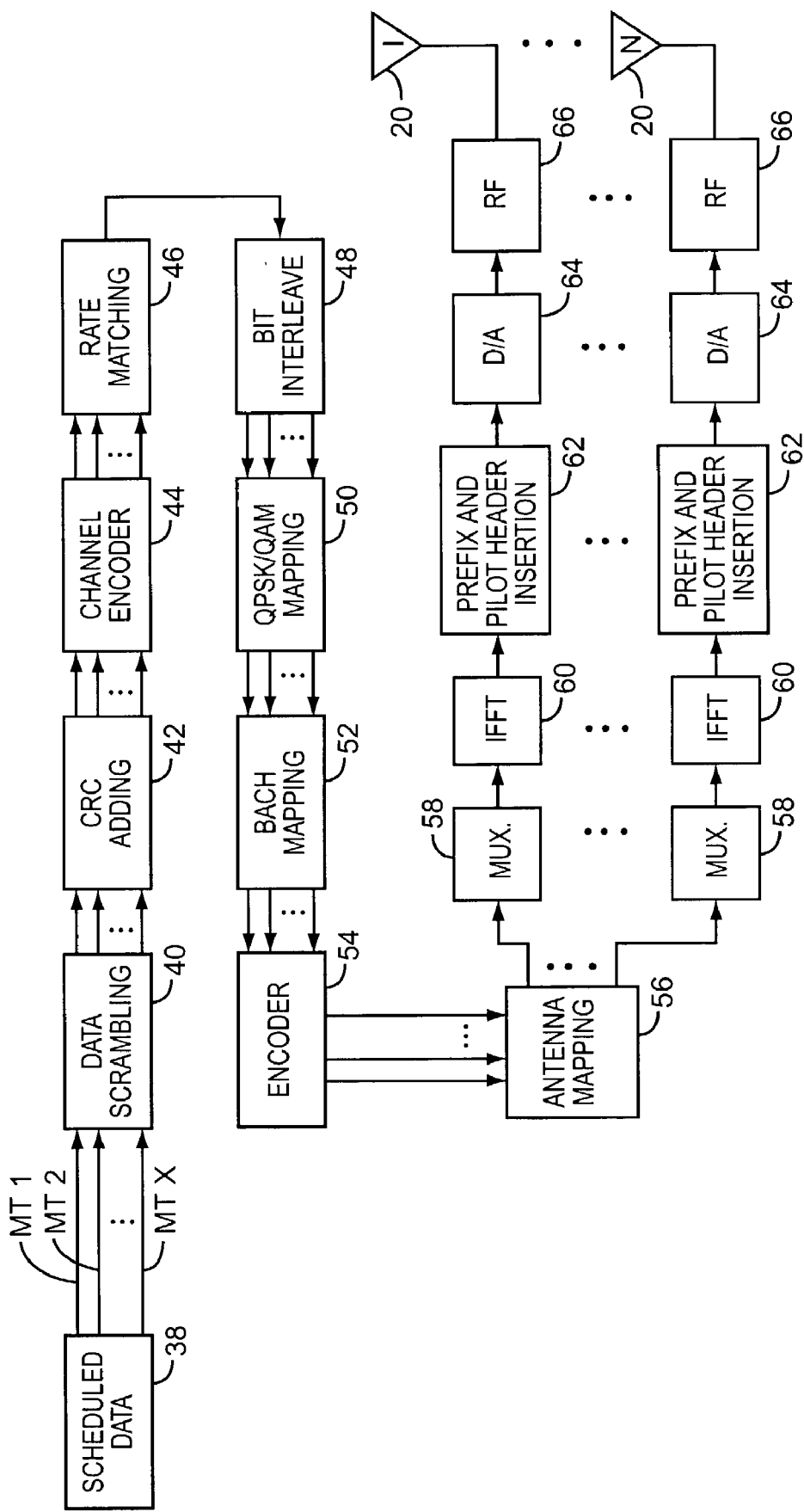
FIG. 10 is a logical representation of a transmitter according to one embodiment of the present invention.

With reference to FIG. 10, a logical transmission architecture is provided according to one embodiment. In this embodiment, the base station 10 and user element 24 have multiple antennas; however, those skilled in the art will recognize the applicability of the present invention to less complicated, single-antennas embodiments. Further, the transmission architecture is described as being that of the base station 10, but those skilled in the art will recognize the applicability of the illustrated architecture for uplink and downlink communications. Initially, a base station controller (not shown) sends data in the form a series of data bits intended for multiple user elements 24 (users 1 through x) to the base station 10. The base station 10 will schedule the data for transmission during select time slots. The scheduled data bits 38 for each user element 24 are preferably scrambled in a manner reducing the peak-to-average power ratio associated with the bit stream using data scrambling logic 40. A cyclic redundancy check (CRC) for the scrambled bits is determined and appended to portions of the scrambled bits using CRC adding logic 42. Next, channel coding is performed using channel encoder logic 44 to effectively add redundancy to the groups of bits to facilitate recovery and error correction at the user element 24. The channel encoder logic 44 uses known Turbo encoding techniques in one embodiment. The encoded data is then processed by rate matching logic 46 to compensate for the data expansion associated with encoding.

Bit interleaver logic 48 systematically reorders the bits in the encoded data to minimize the potential for loss of consecutive bits during transmission. Based on the desired modulation, which is preferably Quadrature Amplitude Modulation (QAM) or Quadrature Phase Shift Key (QPSK) modulation, groups of the bits are systematically mapped into corresponding symbols by the QPSK/QAM mapping logic 50. The symbols may be systematically reordered to further bolster the immunity of the transmitted signal to periodic data loss caused by frequency selective fading. Next, the symbols for each user are each encoded onto sub-carriers according to a defined index by BACH mapping logic 52 as above described. Accordingly, the symbols for a select user element 24 are encoded onto sub-carriers into one or more BACHs assigned to the user element 24.

If space-time coding (STC) is employed, symbols on each sub-carrier may be presented to optional STC encoder logic 54, which processes blocks of symbols to modify the symbols in a fashion making the transmitted signals more resistant to interference and readily decoded at a user element 24 or to enhance spectrum efficiency. The STC encoder logic 54 will process the incoming symbols according to a selected STC encoding mode and provide n outputs, which may corresponding to the number of transmit antennas 20 for the base station 10. For further detail, see A. F. Naguib, N. Seshadri, and A. R. Calderbank, "Applications of space-time codes and interference suppression for high capacity and high data rate wireless systems," Thirty-Second Asilomar Conference on Signals, Systems & Computers, Volume 2, pp. 1803-1810, 1998, which is incorporated herein by reference in its entirety.

Regardless of STC encoding, the modulated sub-carriers may be selectively directed along a transmission paths associated with a desired one of the antennas 20 by antenna mapping logic 56. Preferably, the antenna mapping logic 56 facilitates spatial hopping for each user element 24 by pseudo-randomly changing the antenna 20 used to transmit the modulated sub-carriers for any given user element 24.

Multiplexing logic 58 cooperates with the antenna mapping logic 56 to associate and combine sub-carriers for any of the given user elements 24 for processing by IFFT logic 60. For each transmission path, there is a group of sub-carriers. The IFFT logic 60 will perform some form of inverse Fast Fourier Transform, such as an Inverse Discrete Fast Fourier Transform (IDFT) to produce an OFDM symbol in the time domain. The OFDM symbol will include the frequency components of each of the modulated sub-carriers for a given time period. Generally, the length of time for the OFDM symbol is equal to the reciprocal of the spacing of the sub-carriers, and is relatively long compared to the data rate associated with the incoming data bits.

After IFFT processing, a cyclic prefix and pilot headers are added to the beginning of the OFDM symbols by prefix and pilot header insertion logic 62. The resultant signals are converted to an analog signal via digital-to-analog (D/A) conversion circuitry 64. The resultant analog signals are then simultaneously amplified, and transmitted via the RF circuitry 66 to the respective antennas 20 in the corresponding transmission path.

Figure 11:
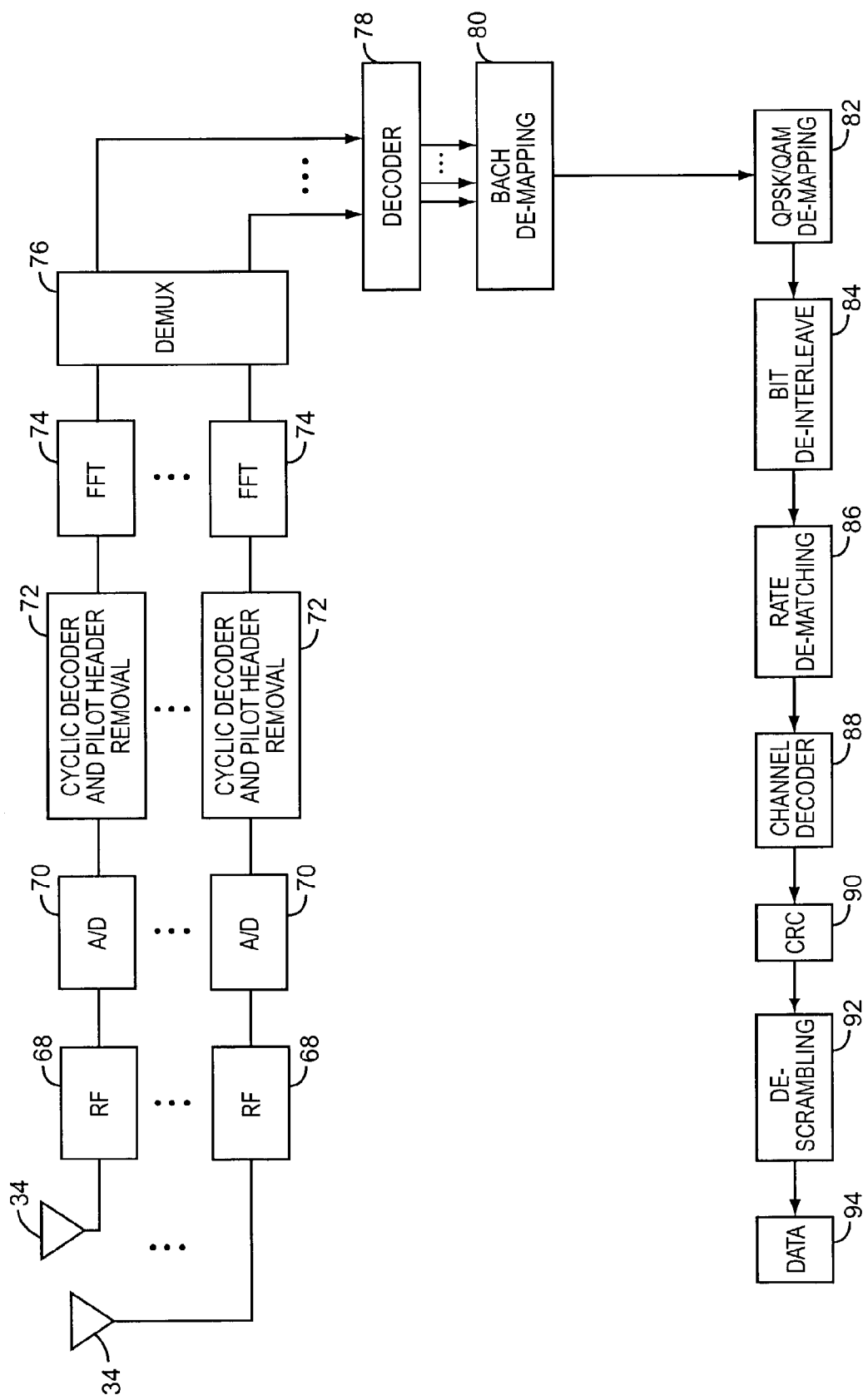
FIG. 11 is a logical representation of a receiver according to one embodiment of the present invention.

Reference is now made to FIG. 11. Upon arrival of the transmitted signals at each of the antennas 34 of the user element 24, the signals are downconverted and amplified by the RF receive circuitries 68. Analog-to-digital (A/D) converters 70 then digitize these analog signals for digital processing. The cyclic prefixes and pilot headers are removed by the cyclic decoder and pilot header removal logic 72. Respective FFT processors 74 operate to facilitate a Fast Fourier Transform on the digitized signals to convert the received time domain OFDM symbols into a group of modulated sub-carriers in the frequency domain. Preferably, a subset FFT is performed to recover only those sub-carriers carrying information that is intended for the user element 24. Since the sub-carriers carrying such data will change from symbol to symbol based on the BACH indexing, the FFT logic will synchronously change processing from one OFDM symbol to another. The transform is preferably accomplished using a Discrete Fourier Transform. Demultiplexing logic 76 combines the sub-carriers from each of the receive paths and presents the recovered sub-carriers to an STC decoder 78, if space-time coding was employed during transmission. The STC decoder 78 implements STC decoding on the symbols in the sub-carriers.

Regardless of STC decoding, the recovered set of sub-carriers is sent to BACH de-mapping logic 80, which will de-map the symbols from the respective sub-carriers for delivery to QPSK/QAM de-mapping logic 82. The de-mapped symbols are converted to a corresponding bitstream using the QPSK/QAM de-mapping logic 82. The bits are then de-interleaved using bit de-interleaver logic 84, which corresponds to the bit interleaver logic 48 of the transmitter architecture. The de-interleaved bits are then processed by rate de-matching logic 86 and presented to channel decoder logic 88 to recover the initially scrambled data and the CRC checksum. Accordingly, CRC logic 90 removes the CRC checksum, checks the scrambled data in traditional fashion, and provides it to the de-scrambling logic 92 for de-scrambling using the known base station de-scrambling code to recover the originally transmitted data 94.

Those skilled in the art will recognize improvements and modifications to the preferred embodiments of the present invention. All such improvements and modifications are considered within the scope of the concepts disclosed herein and the claims that follow.

What is claimed is:

1. A method comprising:
a) associating data to be transmitted to a plurality of user elements with corresponding basic access channels, each basic access channel (BACH) defined by a number of sub-carriers distributed across multiple orthogonal frequency division multiplexing (OFDM) symbols, the number of sub-carriers being a minimum number needed to provide a desired service to a user associated with the user elements;
b) allocating a plurality of groups of two or more sub-carriers to provide the desired service;
c) mapping the data into quadrature-based symbols;
d) for each of the user elements, encoding the quadrature-based symbols onto the sub-carriers for the BACH associated with the user element; and
e) modulating the sub-carriers using an Inverse Fast Fourier Transform to create the OFDM symbols for transmission.

2. The method of claim 1 wherein the sub-carriers defining each BACH are equally spaced and distributed across a frequency band associated with the OFDM symbols.

3. The method of claim 2 wherein the number of sub-carriers defining each BACH is $2^n$ where n is an integer.

4. The method of claim 1 wherein the number of sub-carriers defining each BACH is $2^n$ where n is an integer.

5. The method of claim 1 further comprising coding the quadrature symbols prior to encoding the quadrature symbols onto the sub-carriers using space-time codes, wherein the sub-carriers associated with the BACH over consecutive OFDM symbols are consistent for a set of space-time encoded symbols.

6. The method of claim 1 wherein the BACH provides a minimum throughput rate.

7. The method of claim 6 wherein the minimum throughput rate supports voice communications.

8. The method of claim 1 further comprising associating a plurality of the BACHs to select ones of the plurality of user elements to facilitate transmission of the data based on a desired throughput rate for each user element.

9. The method of claim 8 wherein a plurality of BACHs are associated with a select one of the plurality of user elements according to the maximum distance partition rule.

10. The method of claim 8 wherein transmissions occur during defined time slots and further comprising scheduling transmission of the data during time slots for each of the plurality of user elements based on the desired throughput rate.

11. The method of claim 1 wherein the hopping pattern for the sub-carriers identifying the BACHs over OFDM symbols is pseudo-random.

12. The method of claim 1 wherein BACH mapping for different cells or sectors of a base station is different.

13. The method of claim 1 wherein BACH mapping for different cells or sectors of a base station is pseudo-random.

14. The method of claim 1 wherein transmission occurs from a plurality of antennas and the BACHs hop between the plurality of antennas during transmission.

15. The method of claim 1 wherein transmission occurs from a plurality of antennas and the BACHs are mapped to different ones of the plurality of antennas.

16. The method of claim 1 further comprising encoding the quadrature-based symbols for a second user element onto sub-carriers for a BACH already encoded with quadrature-based symbols for a first user element to effectively overlay the quadrature-based symbols for the second user element over the quadrature-based symbols for the first user element.

17. A method comprising:
a) receiving orthogonal frequency division multiplexing (OFDM) symbols;
b) demodulating transmitted OFDM symbols using a Fast Fourier Transform to recover sub-carriers encoded with quadrature-based symbols, said sub-carriers encoded with the quadrature based symbols providing a basic access channel (BACH) defined by a minimum number of sub-carriers needed to provide a desired service to a user, and wherein the sub-carriers are allocated as a plurality of groups of two or more sub-carriers to provide the desired service; and c) decoding the quadrature-based symbols encoded onto the sub-carriers to recover data.

18. The method of claim 17 wherein the sub-carriers defining each BACH are equally spaced and distributed across a frequency band associated with the OFDM symbols.

19. The method of claim 18 wherein the number of sub-carriers defining each BACH is $2^n$ where n is an integer.

20. The method of claim 17 wherein the number of sub-carriers defining each BACH is $2^n$ where n is an integer.

21. The method of claim 17 wherein the BACH provides a minimum throughput rate.

22. The method of claim 21 wherein the minimum throughput rate supports voice communications.

23. The method of claim 17 further comprising associating a plurality of BACHs to select ones of the plurality of user elements to facilitate transmission of the data based on a desired throughput rate for each user element.

24. A transmitter comprising baseband processing logic and associated transmission circuitry adapted to:
a) associate data to be transmitted to a plurality of user elements with corresponding basic access channels, each basic access channel (BACH) defined by a number of sub-carriers distributed across multiple orthogonal frequency division multiplexing (OFDM) symbols, the number of sub-carriers being a minimum number needed to provide a desired service to a user associated with the user elements;
b) allocate a plurality of groups of two or more sub-carriers to provide the desired service;
c) map the data into quadrature-based symbols;
d) for each user element, encode the quadrature-based symbols onto the sub-carriers for the BACH associated with the user element; and
e) modulate the sub-carriers using an Inverse Fast Fourier Transform to create the OFDM symbols for transmission.

25. The transmitter of claim 24 wherein the sub-carriers defining each BACH are equally spaced and distributed across a frequency band associated with the OFDM symbols.

26. The transmitter of claim 25 wherein the number of sub-caters defining each BACH is $2^n$ where n is an integer.

27. The transmitter of claim 24 wherein the number of sub-carriers defining each BACH is $2^n$ where n is an integer.

28. The transmitter of claim 24 wherein the baseband processing logic and transmission circuitry is further adapted to encode the quadrature-based symbols using space-time codes prior to encoding the quadrature-based symbols onto the sub-carriers, wherein the sub-carriers associated with the BACH over consecutive OFDM symbols are consistent for a set of space-time encoded symbols.

29. The transmitter of claim 24 wherein the BACH provides a minimum throughput rate.

30. The transmitter of claim 29 wherein the minimum throughput rate supports voice communications.

31. The transmitter of claim 24 wherein the baseband processing logic and transmission circuitry is further adapted to associate a plurality of BACHs to select ones of the plurality of user elements to facilitate transmission of the data based on a desired throughput rate for each user element.

32. The transmitter of claim 31 wherein transmissions occur during defined time slots and the baseband processing logic and transmission circuitry is further adapted to schedule transmission of the data during time slots for each of the plurality of user elements based on the desired throughput rate.

33. The transmitter of claim 24 wherein a plurality of BACHs are associated with a select one of the plurality of user elements according to the maximum distance partition rule.

34. The transmitter of claim 24 wherein the hopping pattern for the sub-carriers identifying the BACHs over OFDM symbols is pseudo-random.

35. The transmitter of claim 24 wherein BACH mapping for different cells or sectors of a base station is different.

36. The transmitter of claim 24 wherein BACH mapping for different cells or sectors is pseudo-random.

37. The transmitter of claim 24 wherein transmission occurs from a plurality of antennas and the BACHs hop between the plurality of antennas during transmission.

38. The transmitter of claim 24 wherein transmission occurs from a plurality of antennas and the BACHs are mapped to different ones of the plurality of antennas.

39. The transmitter of claim 24 wherein the baseband processing logic and transmission circuitry is further adapted to encode the quadrature-based symbols for a second user element onto sub-carriers for a BACH already encoded with quadrature-based symbols for a first user element to effectively overlay the quadrature-based symbols for the second user element over the quadrature-based symbols for the first user element.

40. A receiver comprising baseband processing logic and associated receive circuitry adapted to:
a) receive orthogonal frequency division multiplexing (OFDM) symbols;
b) demodulate transmitted OFDM symbols using a Fast Fourier Transform to recover sub-carriers encoded with quadrature-based symbols, said sub-carriers encoded with the quadrature-based symbols providing a basic access channel (BACH) defined by a minimum number of sub-carriers needed to provide a desired service to a user, and wherein the sub-caters are allocated as a plurality of groups of two or more sub-caters to provide the desired service; and
c) decode the quadrature-based symbols encoded onto the sub-carriers to recover data.

41. The receiver of claim 40 wherein the sub-carriers defining each BACH are equally spaced and distributed across a frequency band associated with the OFDM symbols.

42. The receiver of claim 41 wherein the number of sub-carriers defining each BACH is $2^n$ where n is an integer.

43. The receiver of claim 40 wherein the number of sub-carriers defining each BACH is $2^n$ where n is an integer.

44. The receiver of claim 40 wherein the BACH provides a minimum throughput rate.

45. The receiver of claim 44 wherein the minimum throughput rate supports voice communications.

46. The receiver of claim 40 wherein the baseband processing logic and receive circuitry are further adapted to associate a plurality of BACHs to select ones of the plurality of user elements to facilitate transmission of the data based on a desired throughput rate for each user element.

47. A transmitter comprising:
a) means for associating data to be transmitted to a plurality of user elements with corresponding basic access channels, each basic access channel (BACH) defined by a number of sub-carriers distributed across multiple orthogonal frequency division multiplexing (OFDM) symbols, the number of sub-carriers being a minimum number needed to provide a desired service to a user associated with the user elements;
b) means for allocating a plurality of groups of two or more sub-carriers to provide the desired service;
c) means for mapping the data into quadrature-based symbols;
means for encoding the quadrature-based symbols onto the sub-carriers for the BACH associated with the user element for each user element; and
d) means for modulating the sub-carriers using an Inverse Fast Fourier Transform to create the OFDM symbols for transmission.

* * * * *

UNITED STATES PATENT AND TRADEMARK OFFICE
CERTIFICATE OF CORRECTION

PATENT NO. : 7,317,680 B2
APPLICATION NO. : 10/261739
DATED : January 8, 2008
INVENTOR(S) : Jianglei Ma et al.

Page 1 of 1

It is certified that error appears in the above-identified patent and that said Letters Patent is hereby corrected as shown below:

In the Claims:

In column 11, line 46, in Claim 26, delete "sub-caters" and insert -- sub-carriers --, therefor.

In column 12, line 40, in Claim 40, delete "sub-caters" and insert -- sub-carriers --, therefor.

In column 12, line 41, in Claim 40, delete "sub-caters" and insert -- sub-carriers --, therefor.

Signed and Sealed this
Thirtieth Day of July, 2013

Teresa Stanek Rea
*Acting Director of the United States Patent and Trademark Office*